US012436126B2

(12) United States Patent
Stein et al.

(10) Patent No.: US 12,436,126 B2
(45) Date of Patent: Oct. 7, 2025

(54) APPARATUSES AND METHODS FOR DETECTING CRACKS

(71) Applicant: Analog Devices International Unlimited Company, Limerick (IE)

(72) Inventors: Yosef Stein, Sharon, MA (US); Haim Primo, Ganei Tikva (IL)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 39 days.

(21) Appl. No.: 18/088,257

(22) Filed: Dec. 23, 2022

(65) Prior Publication Data
US 2024/0060925 A1    Feb. 22, 2024

Related U.S. Application Data

(60) Provisional application No. 63/376,700, filed on Sep. 22, 2022, provisional application No. 63/398,445, filed on Aug. 16, 2022.

(51) Int. Cl.
*G01N 27/20*    (2006.01)
*G01N 27/14*    (2006.01)
*G01R 27/14*    (2006.01)

(52) U.S. Cl.
CPC ............ *G01N 27/20* (2013.01); *G01R 27/14* (2013.01)

(58) Field of Classification Search
CPC ...... G01N 27/20; G01N 27/041; G01N 27/00; G01N 3/00; G01N 3/02; G01N 2203/0064; G01N 2203/0066; G01N 2203/00; G01N 2203/0073; G01R 27/14; G01M 5/0033; G01M 5/00; G01M 5/0016; G01M 5/0083
See application file for complete search history.

(56) References Cited

U.S. PATENT DOCUMENTS

| | | | |
|---|---|---|---|
| 4,255,974 A | 3/1981 | Dufrane et al. | |
| 5,349,867 A * | 9/1994 | Park | G01L 9/0051 338/4 |
| 6,973,838 B2 | 12/2005 | Denis | |
| 10,048,184 B2 | 8/2018 | Komiya | |
| 10,648,871 B2 | 5/2020 | Bradbury | |
| 11,060,993 B2 | 7/2021 | Redinger | |
| 11,150,209 B2 | 10/2021 | Yungers | |
| 11,435,309 B2 | 9/2022 | Khosravani | |

(Continued)

OTHER PUBLICATIONS

International Search Report and Written Opinion in PCT/EP2023/072378, mailed Nov. 17, 2023, 14 pages.

(Continued)

*Primary Examiner* — Eman A Alkafawi
*Assistant Examiner* — Suresh K Rajaputra
(74) *Attorney, Agent, or Firm* — ArentFox Schiff LLP (57) ABSTRACT

Aspects of the present disclosure include a crack detection system having a crack detection sensor including a plurality of sectors disposed concentrically around a hole within the crack detection sensor, a plurality of contacts configured to electrically connect to one or more sectors of the plurality of sectors, and a crack detection circuit configured to measure resistances of the one or more sectors of the plurality of sectors via two or more of the plurality of contacts to detect a crack in the one or more sectors of the plurality of sectors.

20 Claims, 7 Drawing Sheets

(56) References Cited

U.S. PATENT DOCUMENTS

| | | | |
|---|---|---|---|
| 2011/0089958 A1* | 4/2011 | Malecki | B29C 70/882 |
| | | | 428/297.4 |
| 2012/0235693 A1 | 9/2012 | Feng | |
| 2015/0226579 A1* | 8/2015 | Nino | G01M 5/0083 |
| | | | 324/537 |
| 2016/0202161 A1 | 7/2016 | Komiya | |
| 2019/0346396 A1* | 11/2019 | Redinger | G01N 27/20 |
| 2021/0190714 A1* | 6/2021 | Khosravani | G01N 27/24 |
| 2021/0239545 A1 | 8/2021 | Banica et al. | |
| 2024/0060865 A1* | 2/2024 | Stein | G01N 27/041 |

OTHER PUBLICATIONS

International Search Report and Written Opinion in PCT/EP2023/072379, mailed Nov. 17, 2023, 15 pages.

* cited by examiner

APPARATUSES AND METHODS FOR DETECTING CRACKS

CROSS REFERENCE TO RELATED APPLICATIONS

The current application claims priority to, and the benefit of, U.S. Provisional Application Nos. 63/398,445 filed Aug. 16, 2022 and entitled "CENTER PROPAGATING CRACK SENSING ELEMENT," and 63/376,700 filed Sep. 22, 2022 and entitled "CENTER PROPAGATING CRACK SENSOR," the contents of which are hereby incorporated by reference in their entireties.

BACKGROUND

In many applications, such as aircraft maintenance, it is important to detect any cracks that may be formed in a device (e.g., aircraft). Cracks may form due to thermal and/or mechanical stress, impacts, manufacturing defects, or other reasons. Cracks may cause failures of the device, which may even lead to loss of human life. If cracks are detected prior to failure, maintenance engineers/staffs may repair and/or replace the parts with cracks to ensure continuous and safe operation of the device. However, it may be difficult to detect cracks, especially if the sizes of the cracks are small (e.g., less than 1 millimeter). Thus, improvements in crack detection may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include a crack detection system having a crack detection sensor including a plurality of sectors disposed concentrically around a hole within the crack detection sensor, a plurality of contacts configured to electrically connect to one or more sectors of the plurality of sectors, and a crack detection circuit configured to measure resistances of the one or more sectors of the plurality of sectors via two or more of the plurality of contacts to detect a crack in the one or more sectors of the plurality of sectors.

Aspects of the present disclosure include a crack detection sensor a plurality of sectors disposed concentrically around a hole within the crack detection sensor, wherein each of the plurality of sectors abuts two neighboring sectors and the hole, and a plurality of contacts each disposed between two abutting sectors of the plurality of sectors, wherein the crack detection sensor is a circle.

Aspects of the present disclosure include a crack detection system having a crack detection sensor including a plurality of sectors disposed concentrically around a hole within the crack detection sensor, a plurality of contacts configured to electrically couple with one or more sectors of the plurality of sectors, and a crack detection circuit including: a current source configured to provide a source current to the crack detection sensor, a switch configured to select two or more of the plurality of contacts for providing the source current, and an analog-to-digital converter configured to: measure a voltage difference between the two or more of the plurality of contacts, and determine, based on the source current and the voltage difference, resistances of the one or more sectors of the plurality of sectors via the two or more of the plurality of contacts to detect a crack in the one or more sectors of the plurality of sectors.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

An aspect of the present disclosure includes a fatigue detection sensor configured to detect the formation cracks and/or the sizes of the cracks. The fatigue detection sensor may include multiple sectors delimited by multiple electrical contacts. In some aspects, an electrical current may be applied across two of the multiple electrical contacts to measure the resistance of the one or more sectors between the electrical contacts.

In certain aspects of the present disclosure, the fatigue detection sensor may include a plurality of symmetrical sectors. In one aspect of the present disclosure, a crack may propagate across two of the plurality of symmetrical sectors. A controller may be configured to measure the strain, temperature, and/or other environmental factors via the remaining sectors of the plurality of symmetrical sectors. Based on the measurement, the controller may be configured to measure the resistances of the two of the plurality of symmetrical sectors to determine the presence of the crack.

In some aspects of the present disclosure, one or more of the fatigue detection sensors may be mounted on an aircraft. For example, one or more of the fatigue detection sensors may be mounted on the wings of an aircraft, the blades of a helicopter, or other parts that are critical to the operation of the aircraft.

Figure 1:
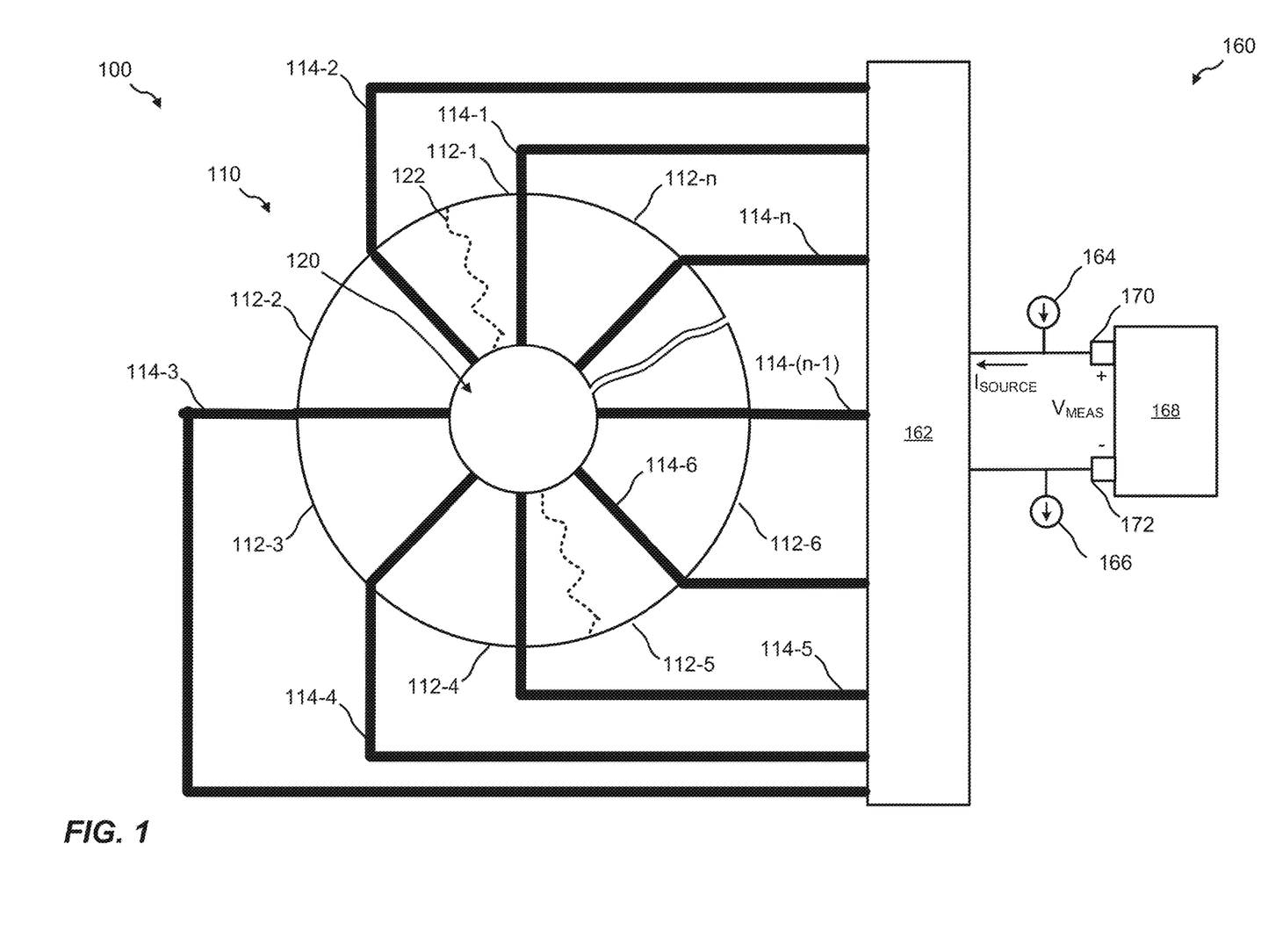
FIG. 1 illustrates an example of a crack detection system according to aspects of the present disclosure.

Turning to FIG. 1, in one aspect of the present disclosure, a detection system 100 may be configured to detect cracks within a crack detection sensor 110 by applying an electrical current across sectors of the crack detection sensor 110 via a crack detection circuit 160. The crack detection circuit 160 may measure changes in resistance of the sectors of the crack detection sensor 110 to determine the presence and/or size of the cracks.

In certain aspects, the detection system 100 may include a crack detection sensor 110. The crack detection sensor 110 may include a sensing element having detection materials, such as polymer nano-composite (PNC) materials. In some aspects, the crack detection sensor 110 may include a nanotube based material, such as a carbon nanotube based (CNT-based) material. The crack detection sensor 110 may include a plurality of sectors 112-1, 112-2 . . . 112-*n*, where n is a positive integer. In the example shown in FIG. 1, n may be 7, 8, or larger. Other numbers for n may be implemented, such as even numbers or odd numbers. Each of the plurality of sectors 112-1, 112-2 . . . 112-*n* may be 360°/n wide.

In some aspects, the detection system 100 may include a plurality of contacts 114-1, 114-2 . . . 114-*n*. Each of the plurality of contacts 114-1, 114-2 . . . 114-*n* may be formed (partially or completely) in between pairs of the plurality of sectors 112-1, 112-2 . . . 112-*n*. Alternatively, any of the plurality of contacts 114-1, 114-2 . . . 114-*n* may delimit pairs of the plurality of sectors 112-1, 112-2 . . . 112-*n*. For example, the plurality of contacts 114-1, 114-2 . . . 114-*n* may include metal materials being deposited over the crack detection sensor 110 to form the plurality of sectors 112-1, 112-2 . . . 112-*n*.

In an aspect, the crack detection sensor 110 may be shaped such that a hole 120 exists within the crack detection sensor 110. The hole 120 may sever electrical conduction paths between non-neighboring sectors of the plurality of sectors 112-1, 112-2 . . . 112-*n*.

In one aspect of the present disclosure, the detection system 100 may include an electronic system 160 having a switch 162 configured to couple with a first terminal 170 and a second terminal 172 of an analog-to-digital (ADC) converter 168 to two or more of the plurality of contacts 114-1, 114-2 . . . 114-*n*. The electronic system 160 of the detection system 100 may include one or more current sources 164, 166 configured to provide a source current ($I_{SOURCE}$) via two or more of the plurality of contacts 114-1, 114-2 . . . 114-*n*. In some aspects of the present disclosure, the electronic system 160 of the detection system 100 may include the ADC converter configured to detect a measured voltage $V_{MEAS}$ across the first terminal 170 and the second terminal 172.

During operation, the one or more current sources 164, 166 may provide the source current $I_{SOURCE}$ toward the crack detection sensor 110. The switch 162 may operate to provide conduction paths to electrically connect the one or more current sources 164, 166 to two of the plurality of contacts 114-1, 114-2 . . . 114-*n*. As a result, the one or more current sources 164, 166 may provide the source current $I_{SOURCE}$ via two of the plurality of contacts 114-1, 114-2 . . . 114-*n*. For example, the source current $I_{SOURCE}$ may flow toward the crack detection sensor 110 via one of the plurality of contacts 114-1, 114-2 . . . 114-*n*, and flow away from the crack detection sensor 110 via another one of the plurality of contacts 114-1, 114-2 . . . 114-*n*.

In some aspects of the present disclosure, the source current $I_{SOURCE}$ may flow through one or more sectors of the plurality of sectors 112-1, 112-2 . . . 112-*n* (as described below). As the source current $I_{SOURCE}$ flows through the one or more sectors (without cracks) of the plurality of sectors 112-1, 112-2 . . . 112-*n*, a voltage may develop between the two of the plurality of contacts 114-1, 114-2 . . . 114-*n*. The two of the plurality of contacts 114-1, 114-2 . . . 114-*n* may be electrically connected to the first terminal 170 and the second terminal 172 via the switch 162. The voltage developed between the two of the plurality of contacts 114-1, 114-2 . . . 114-*n* due the source current $I_{SOURCE}$ may cause the $V_{MEAS}$ to be developed between the first terminal 170 and the second terminal 172. The ADC 168 may measure the $V_{MEAS}$ at the first terminal 170 and the second terminal 172. As the source current $I_{SOURCE}$ flows through the one or more sectors (with cracks) of the plurality of sectors 112-1, 112-2 . . . 112-*n*, the $V_{MEAS}$ measured by the ADC 168 may change. Based on the change in the $V_{MEAS}$, the ADC 168 may be configured to determine the presence and/or size of the cracks.

In other aspects, the crack detection sensor 110 may have a different shape. For example, the crack detection sensor 110 may include a plurality of symmetrical sectors that are squares, rectangles, triangles, or other shapes. The crack detection sensor 110 may be configured to detect the crack 122, and/or other imperfections/damages such as tears, fissures, breaks, etc.

Figure 2:
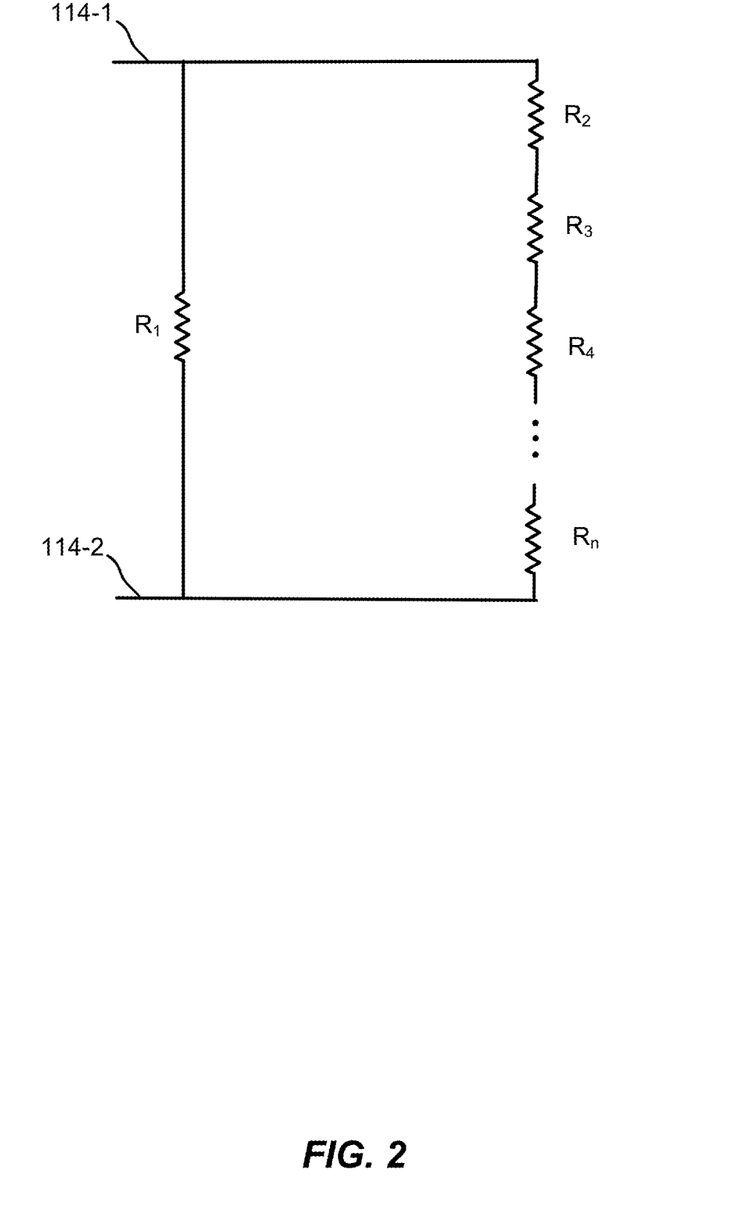
FIG. 2 illustrates an example of a diagram showing an equivalent circuit according to aspects of the present disclosure.

FIG. 2 illustrates an example equivalent circuit during the operation of the crack detection sensor 110. Referring to FIGS. 1 and 2, in one example, the one or more current sources 164, 166 may provide the source current $I_{SOURCE}$. The switch 162 may connect the first terminal 170 and the second terminal 172 to a first contact 114-1 and a second contact 114-2 of the plurality of contacts 114-1, 114-2 . . . 114-*n*. Therefore, the ADC 168 may measure the equivalent resistances of the sectors from the first contact 114-1 and the second contact 114-2 based on the source current $I_{SOURCE}$ and the $V_{MEAS}$. The equivalent resistances of the sectors (as measured at the first terminal 170 and the second terminal 172) may include a first resistance $R_1$ of a first sector 112-1 of the plurality of sectors 112-1, 112-2 . . . 112-*n* in parallel with resistances of $R_2+R_3+R_4 \ldots +R_n$.

In some aspects, there may be N*2 unknowns. For N points of measurements, there may be $$\binom{N}{2} = \frac{N!}{2!(N-2)!}$$

equations. In some instances, there may be more equations than unknowns, and the least square (LS) method may be used for the estimation of the resistances of the resistors. For example, a best-fit curve having a minimum least square errors may be calculated to fit the unknowns.

In one aspect of the present disclosure, the resistances may be described as:

$$R(T,a)=R_{(T=T0,a=a0)}(1+\alpha(T-T0)+\beta(a-a0)),$$

where T is the temperature, a is the strain, and $\alpha$ and $\beta$ are temperature and strain factors, respectively. The resistances may have the same ratio at some calibration point, and temperature and/or aging may not change this ratio.

In some aspects, at calibration, the resistances may be estimated as $R_1, R_2 \ldots R_n$. To compensate for temperature and/or aging, each resistance may be divided by the sum of all other resistances as follows (for $R_1$):

$$Eq(a)\Omega_1 = \frac{R_1}{R_2 + R_3 + \ldots + R_n}.$$

The equation above may be used for each sector resistance. During operation the data may be collected to estimate each sector resistance $\Omega_j$ for each sector J. In a sector that includes a crack, there may be an increased $\Omega_j$ value. If the crack extends to more than one sector, there may be one or more increased $\Omega$ value in the corresponding sectors.

Figure 3:
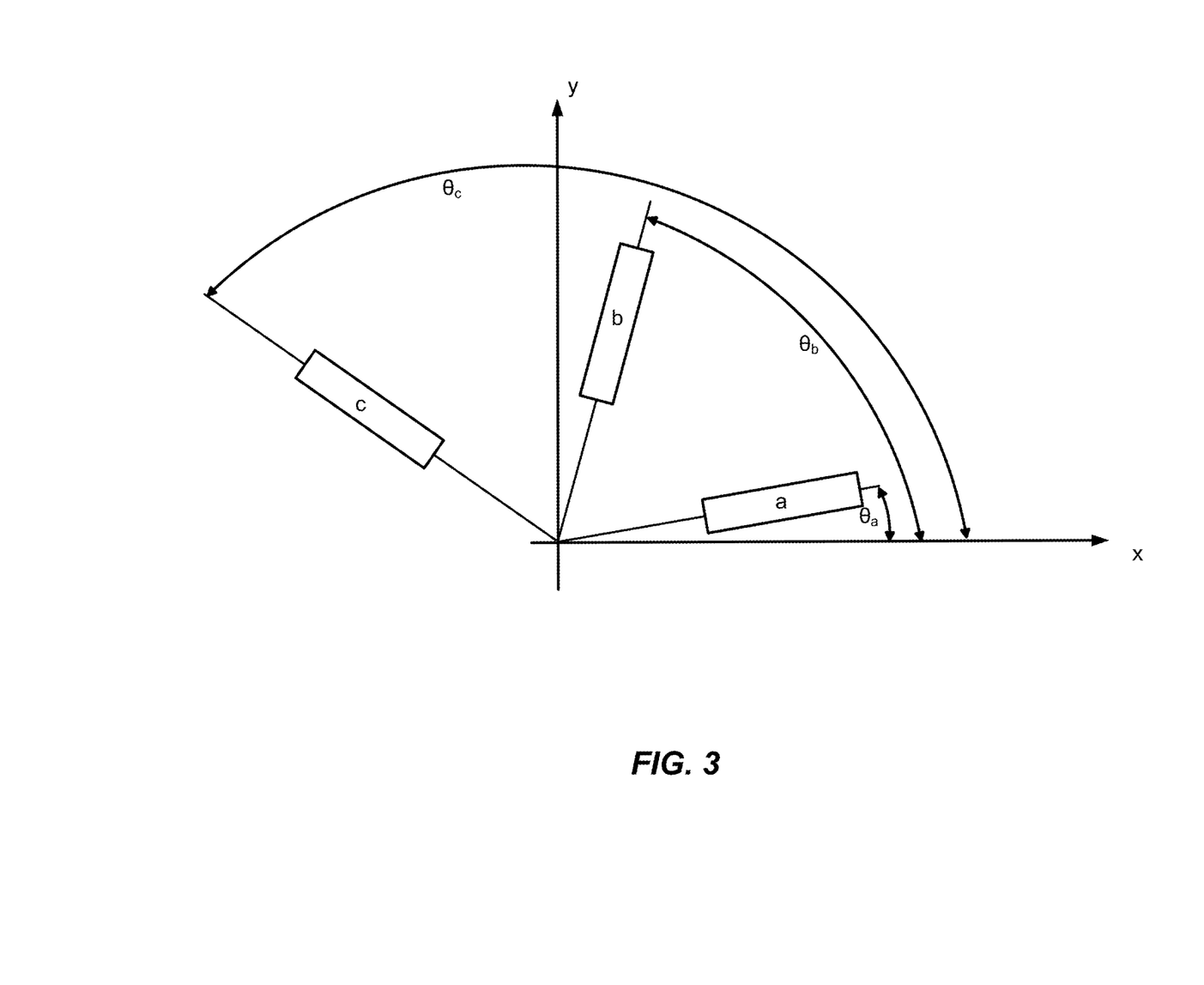
FIG. 3 illustrates an example of a diagram showing strain analysis according to aspects of the present disclosure.

FIG. 3 shows a diagram for illustrating strain analysis. The general Rosette Equations denote measured strains as $\varepsilon_a$, $\varepsilon_b$, and $\varepsilon_c$. Aspects of the present disclosure may include using the strain transformation equation to relate each gauge measurement to $\varepsilon_{xx}$, $\varepsilon_{yy}$, and $\gamma_{xy}$:

$\varepsilon_a = \varepsilon_{xx} \cos^2\theta_a + \varepsilon_{yy} \sin^2\theta_a + \gamma_{xy} \sin\theta_a \cos\theta_a$, $\varepsilon_b = \varepsilon_{xx} \cos^2\theta_b + \varepsilon_{yy} \sin^2\theta_b + \gamma_{xy} \sin\theta_b \cos\theta_b$, and $\varepsilon_c = \varepsilon_{xx} \cos^2\theta_c + \varepsilon_{yy} \sin^2\theta_c + \gamma_{xy} \sin\theta_c \cos\theta_c$.

Figure 4:
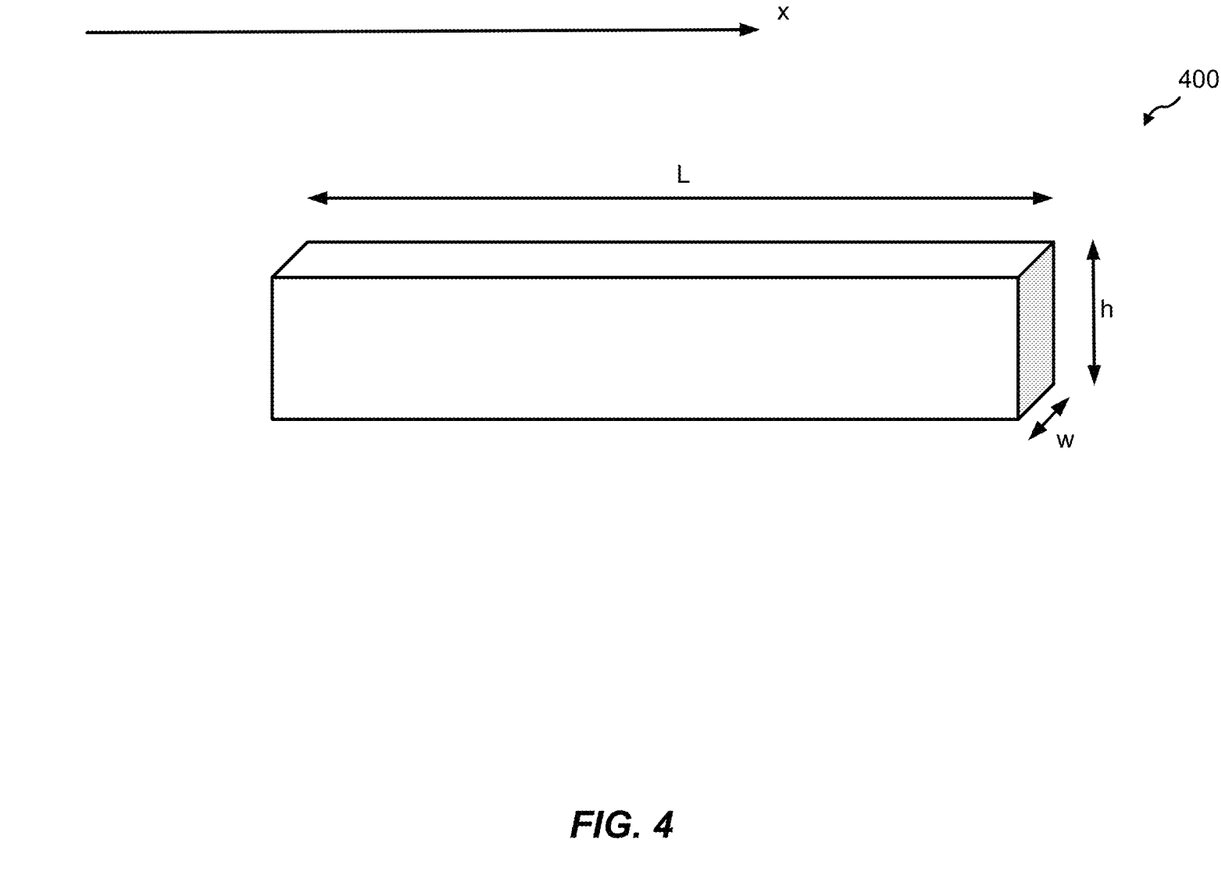
FIG. 4 illustrates an example of strain analysis according to aspects of the present disclosure.

FIG. 4 illustrates an example of strain analysis associated with resistance change caused by force in the x direction. The forces may cause the resistor to stretch by $\Delta L$. In some aspects, before the force is applied in the x direction, the resistance of a bar 400 is $$\rho = \frac{L}{wh}.$$

After applying the force, the length L may be increased to $L+\Delta L$. Since the material may not be changing in volume, the total volume may be equal to $(L+\Delta L)(h+\Delta h)w = Lhw$. The equation may be simplified such that $h\Delta L + L\Delta h = 0$, or that $$-h\frac{\Delta L}{L} = \Delta h.$$

The expression above may yield a new resistance after the force in the x direction is applied such that:

$$\rho = \frac{(L+\Delta L)}{w(h+\Delta h)} = \sim \rho = \frac{L}{wh}\left(1 + 2\frac{\Delta L}{L}\right).$$

Since the material of the bar 400 may be modeled as a spring, the force may cause a linear change in dimension, and hence the change in resistance is approximately linear to the force (e.g., within the first order).

Figure 5:
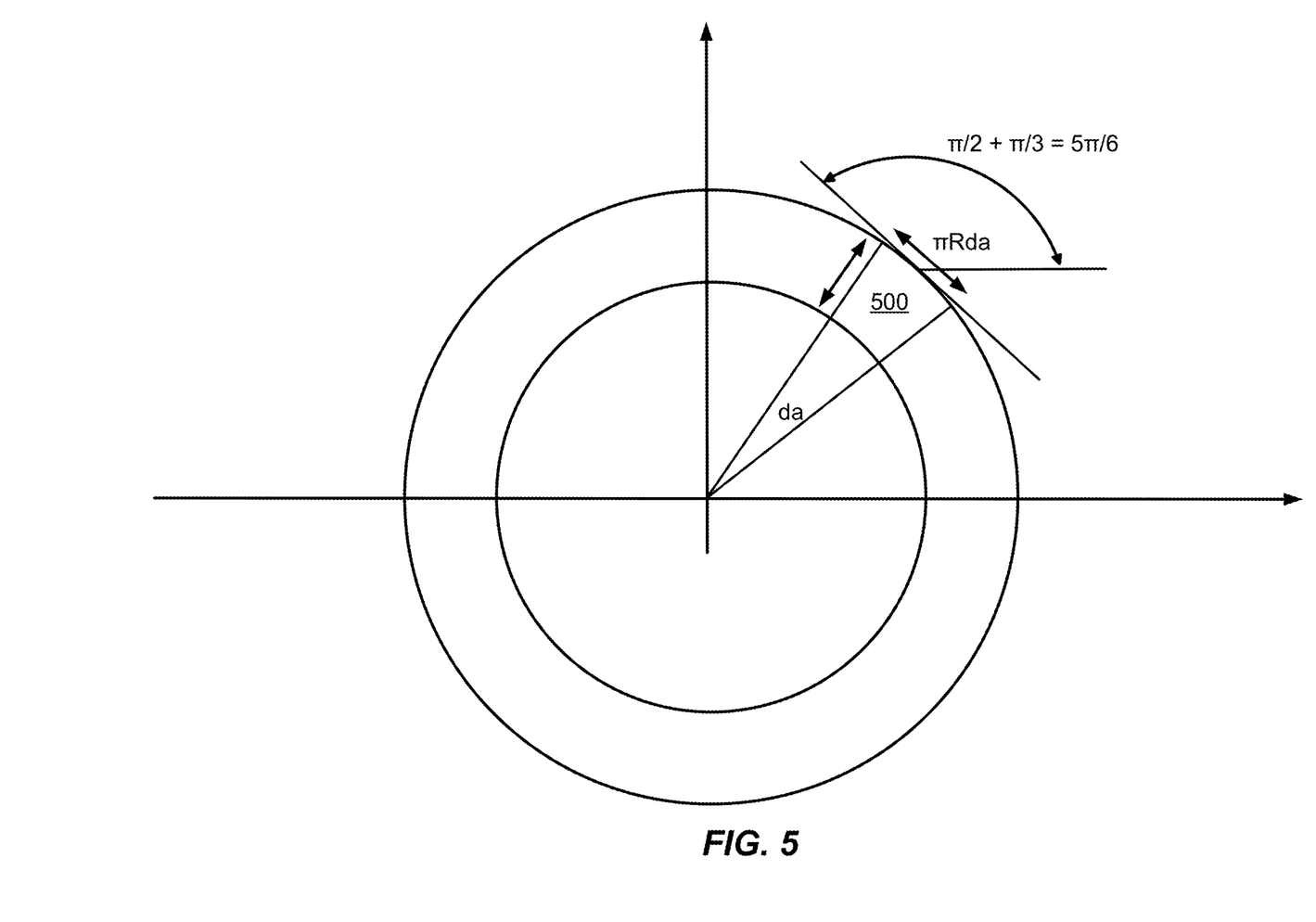
FIG. 5 illustrates an example of strain calculation according to aspects of the present disclosure.

FIG. 5 illustrates an example of a diagram for integrating a segment of a circle to obtain the resistance of a strip 500. Referring to FIGS. 3 and 5, to calculate the resistance of the strip 500, an integration may be performed from $$\alpha = \frac{\pi}{2} \text{ to } \frac{5\pi}{6}.$$

Therefore, the resistance of the strip may be represented as:

$$r_{strip} = \rho \frac{\frac{\pi}{3R}}{hdR}(1 + 2\mu(a_1 e_{xx} + b_1 e_{yy} + c_1 e_{xy}))$$

$$= \rho \frac{\frac{\pi}{3R}}{hdR}(1 + a_1 f_{xx} + b_1 f_{yy} + c_1 f_{xy})$$

where $a_1$, $b_1$, and $c_1$ are geometric constants that may vary based on the location and/or orientation of the sector. Example values of $a_1$, $b_1$, and $c_1$ may be 0.307, 0.74, and −0.375, respectively. Other values may be possible. The $2\mu$ may be the stretch constant and may be multiplied to $e_{xx}$ to yield $f_{xx}$.

In some aspects, when integrating along the radius (or part of the radius), the resistance may be calculated in parallel (i.e., summation over conductance). The expression $(1+a_1 f_{xx}+b_1 f_{yy}+c_1 f_{xy})$ may be constant for all strips and may change the length relatively. If the sensor changes from $R_0$ to R, the equation above may become:

$$r_{sector} = \rho \frac{\frac{\pi}{3R}}{hd(R-R_0)}(1 + a_1 f_{xx} + b_1 f_{yy} + c_1 f_{xy}).$$

Adding aging and temperature effects, the equation above becomes:

$$r_{sector} = \rho \frac{\frac{\pi}{3R}}{hd(R-R_0)}(1 + a_1 f_{xx} + b_1 f_{yy} + c_1 f_{xy})(1 + \alpha(T-T_0)).$$

For every sector, $a_k$, $b_k$, and $c_k$ may be computed for $k=1, 2 \ldots n$ using integration. To mitigate the effect of the strain, after calculating $f_{xx}$, $f_{yy}$, and $f_{xy}$ and knowing $a_k$, $b_k$, and $c_k$, for $k=1, 2 \ldots n$, each resistance may be divided by the suitable factor of $(1+a_k f_{xx}+b_k f_{yy}+c_k f_{xy})$. Examples of n may be 2, 4, 6, 8, or other even numbers.

Figure 6:
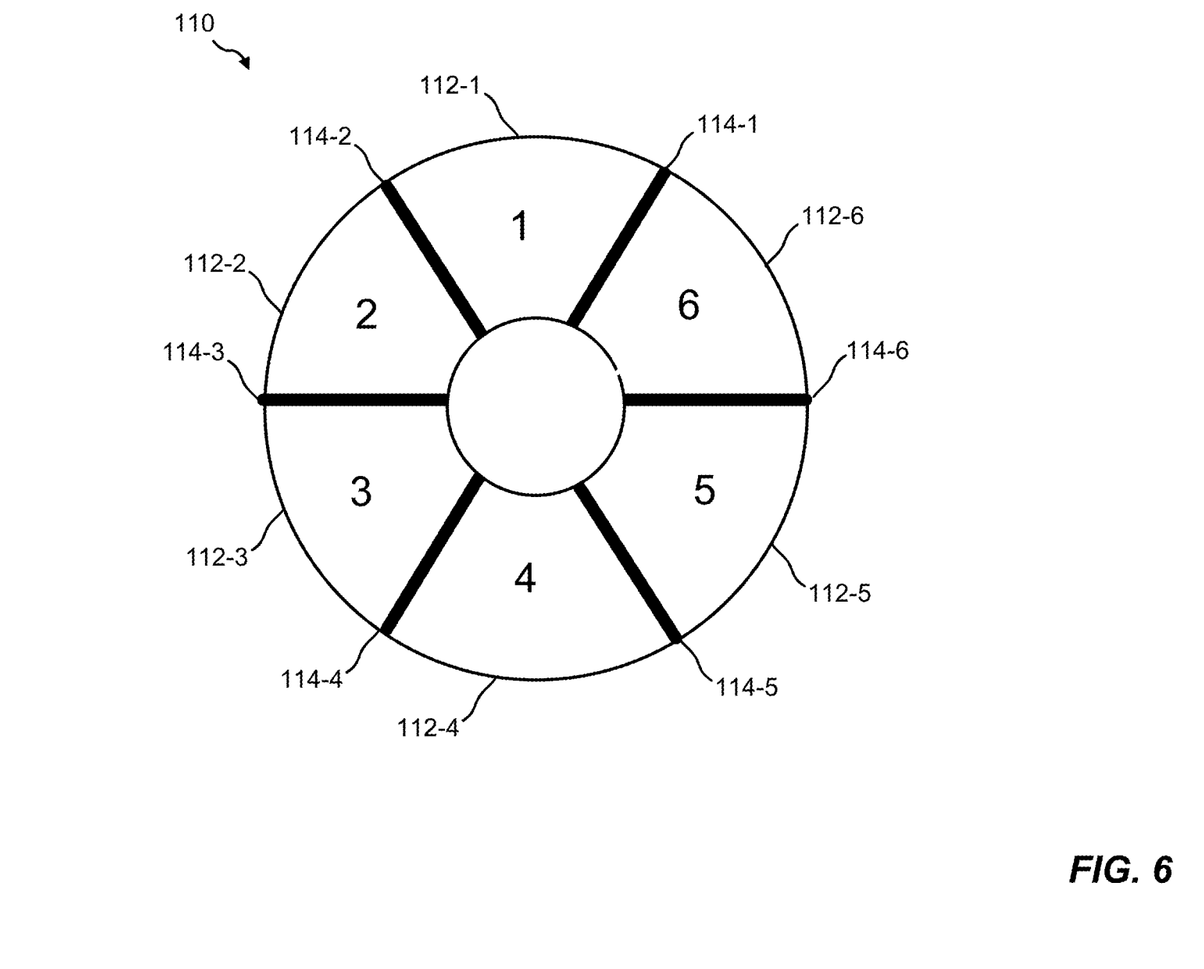
FIG. 6 illustrates an example of a crack detection sensory according to aspects of the present disclosure.

Turning to FIG. 6, an example of the crack detection sensor 110 having 6 sectors may be used to illustrate strain and/or aging calculations according to aspects of the present disclosure. Aspects of the present disclosure include calculating the resistances for each sector at 3 steps: step 1) before installing the crack detection sensor 110 onto a surface (not shown), step 2) after the installation of the crack detection sensor 110 (without crack), and step 3) during operation of the crack detection sensor 110 (presence of crack).

In some aspects, 6 measurements may be performed as discussed above to obtain 6 resistance values associated with each equivalent resistor of the corresponding sector. Each equivalent resistor may be represented as $R_k(T, a)$. The resistance of sector 1 may be indicated by $k=1$, the resistance of sector 2 by $k=2$, and so forth and so on.

In some aspects of the present disclosure, based on the strain theory above, a resistance of a sector may be described by the following equation:

$R(T,a) = R_{(T=T0,a=a0)}(1+\alpha(T-T0)+\beta(a-a0))$.

In some aspects, it may be difficult to predict the temperature and/or aging. The following model may be used in step 1:

$R_k(T,a) = R_{k,0(T=T0,a=a0)}(1+a_k f_{xx}+b_k f_{yy}+c_k f_{xy})$, where $R_k(T, a)$ is the resistance with strain, and $R_{k,0(T=T0,a=a0)}$ is the resistance of a particular sector with no strain. For step 1, there may be 6 unknowns with 6 equations. During step 1, there may not be any strain, and the measurements taken may be used as base line. The resistances for step 1 may be measured and used in the following equations:

Measurement_sector1=$R_{1,0}(T0,a0)\|(\Sigma_{k=2}^{6}R_{k,0}(T0,a0))$  x1)

Measurement_sector2=$R_{2,0}(T0,a0)\|(\Sigma_{k=1,except\,2}^{6}R_{k,0}(T0,a0))$  x2)

Measurement_sector3=$R_{3,0}(T0,a0)\|(\Sigma_{k=1,except\,3}^{6}R_{k,0}(T0,a0))$  x1)

Measurement_sector4=$R_{4,0}(T0,a0)\|(\Sigma_{k=1,except\,4}^{6}R_{k,0}(T0,a0))$  x1)

Measurement_sector5=$R_{5,0}(T0,a0)\|(\Sigma_{k=1,except\,5}^{6}R_{k,0}(T0,a0))$  x1)

Measurement_sector6=$R_{6,0}(T0,a0)\|(\Sigma_{k=1}^{5}R_{k,0}(T0,a0))$.  x1)

Here, subscript 0 may indicate the resistance with no strain.

In some aspects of the present disclosure, during Step 2 (after sensor installation—without crack), some strain may be introduced to the crack detection sensor 110. The follow equation may be used to calculate the resistance of a sector, with temperature and aging factors embedded in the constant K:

$R_k(T1,a1)=R_{k,0(T=T0,a=a0)}(1+a_kf_{xx}+b_kf_{yy}+c_kf_{xy})$,

For step 2, the resistances may be measured, and used in the following 6 equations:

Measurement_sector1=$R_1(T1,a1)\|(\Sigma_{k=2}^{6}R_k(T1,a1))$  x1)

Measurement_sector1=$R_2(T2,a2)\|(\Sigma_{k=1,except\,2}^{6}R_k(T1,a1))$  x2)

Measurement_sector3=$R_3(T1,a1)\|(\Sigma_{k=1,except\,3}^{6}R_k(T1,a1))$  x1)

Measurement_sector4=$R_4(T1,a1)\|(\Sigma_{k=1,except\,4}^{6}R_k(T1,a1))$  x1)

Measurement_sector5=$R_5(T1,a1)\|(\Sigma_{k=1,except\,5}^{6}R_k(T1,a1))$  x1)

Measurement_sector6=$R_6(T1,a1)\|(\Sigma_{k=1}^{5}R_k(T1,a1))$

The term $R_k$ (T1, a1) may be extracted as described above, and there may be 6 equations with 4 unknowns: K, $f_{xx}$, $f_{yy}$, and $f_{xy}$.

$R_1(T1,a1)=R_{1,0(T=T0,a0)}K(1+a_1f_{xx}+b_1f_{yy}+c_1f_{xy})$,  z1)

$R_2(T1,a1)=R_{2,0(T=T0,a0)}K(1+a_2f_{xx}+b_2f_{yy}+c_2f_{xy})$,  z2)

$R_3(T1,a1)=R_{3,0(T=T0,a0)}K(1+a_3f_{xx}+b_3f_{yy}+c_3f_{xy})$,  z3)

$R_4(T1,a1)=R_{4,0(T=T0,a0)}K(1+a_4f_{xx}+b_4f_{yy}+c_4f_{xy})$,  z4)

$R_5(T1,a1)=R_{5,0(T=T0,a0)}K(1+a_5f_{xx}+b_5f_{yy}+c_5f_{xy})$,  z5)

$R_6(T1,a1)=R_{6,0(T=T0,a0)}K(1+a_6f_{xx}+b_6f_{yy}+c_6f_{xy})$,  z6).

Here, the parameters $a_1$, $b_1$, $c_1$ . . . $a_6$, $b_6$, and/or $c_6$ are constants and known. With the equations above, the parameters K, $f_{xx}$, $f_{yy}$, and $f_{xy}$ may be estimated, and used to compensate for the strain effect by the following equation:

w) $R_{k,0}(T1, a1) = \dfrac{R_k(T1, a1)}{1 + a_kf_{xx} + b_kf_{yy} + c_kf_{xy}}$.

After the compensation, the strain free ratios may be calculated (to be used later for crack detection):

p) $\Omega_k = \dfrac{R_{k,0}(T1, a1)}{\sum_{m=1,except\,k}^{6}R_{m,0}(T1, a1)}$.

For step 3, during crack detection (after installation), the resistance of every sector may be measured as above and input into the following 6 equations:

Measurement_sector1=$R_1(T',a')\|(\Sigma_{k=2}^{6}R_k(T',a'))$  q1)

Measurement_sector2=$R_2(T',a')\|(\Sigma_{k=1,except\,2}^{6}R_k(T',a'))$  q2)

Measurement_sector3=$R_3(T',a')\|(\Sigma_{k=1,except\,3}^{6}R_k(T',a'))$  q1)

Measurement_sector4=$R_4(T',a')\|(\Sigma_{k=1,except\,4}^{6}R_k(T1,a1))$  q1)

Measurement_sector5=$R_5(T',a')\|(\Sigma_{k=1,except\,5}^{6}R_k(T1,a1))$  q1)

Measurement_sector6=$R_6(T',a')\|(\Sigma_{k=1}^{5}R_k(T1,a1))$.  q1)

where (T',a') indicate temperature and aging during the crack test. Aspects of the present disclosure include using the following equation:

$R_k(T',a')=R_{k,0(T=T0,a0)}K'(1+a_kf_{xx}+b_kf_{yy}+c_kf_{xy})$.

where $R_{k,0(T0,a0)}$ values are known from step 1 above. The 4 unknowns K', $f_{xx}$, $f_{yy}$, and $f_{xy}$ may be calculated as described below. In one example, it may be possible to use 3 sets of 4 equations for each: a) equations with k=2, 3, 5, 6 (assuming crack is in sectors 1 and 4), b) equations with k=1, 3, 4, 6 (assuming crack is in sectors 2 and 5), and c) equations with k=1, 2, 4, 5 (assuming crack is in sectors 3 and 6). Three sets of parameters K', $f_{xx}$, $f_{yy}$, and $f_{xy}$ may be obtained for one set of equations above.

Aspects of the present disclosure may include compensating for the strain effect as described above using the following equation:

w1) $R_{k,0}(T', a') = \dfrac{R_k(T', a')}{1 + a_kf_{xx} + b_kf_{yy} + c_kf_{xy}}$.

The strain free values may be calculated using the following equation:

p1) $\Omega_k = \dfrac{R_{k,0}(T', a')}{\sum_{m=1,except\,k}^{6}R_{m,0}(T', a')}$.

The strain free values above may be compared to the strain free values in step 2. The one or more sectors of the plurality of sectors 112-1, 112-2 . . . 112-6 with the crack may be detected as the set with difference in $\Omega_k$ (between step 2 and step 3) and the difference exceeds a crack threshold. After the one or more sectors with the crack is detected, the crack size may be estimated using the equation:

$$\frac{\Delta R}{R} \frac{R_{k,0}(T', a')}{R_{k,0(T1,a1)}} - 1.$$

Figure 7:
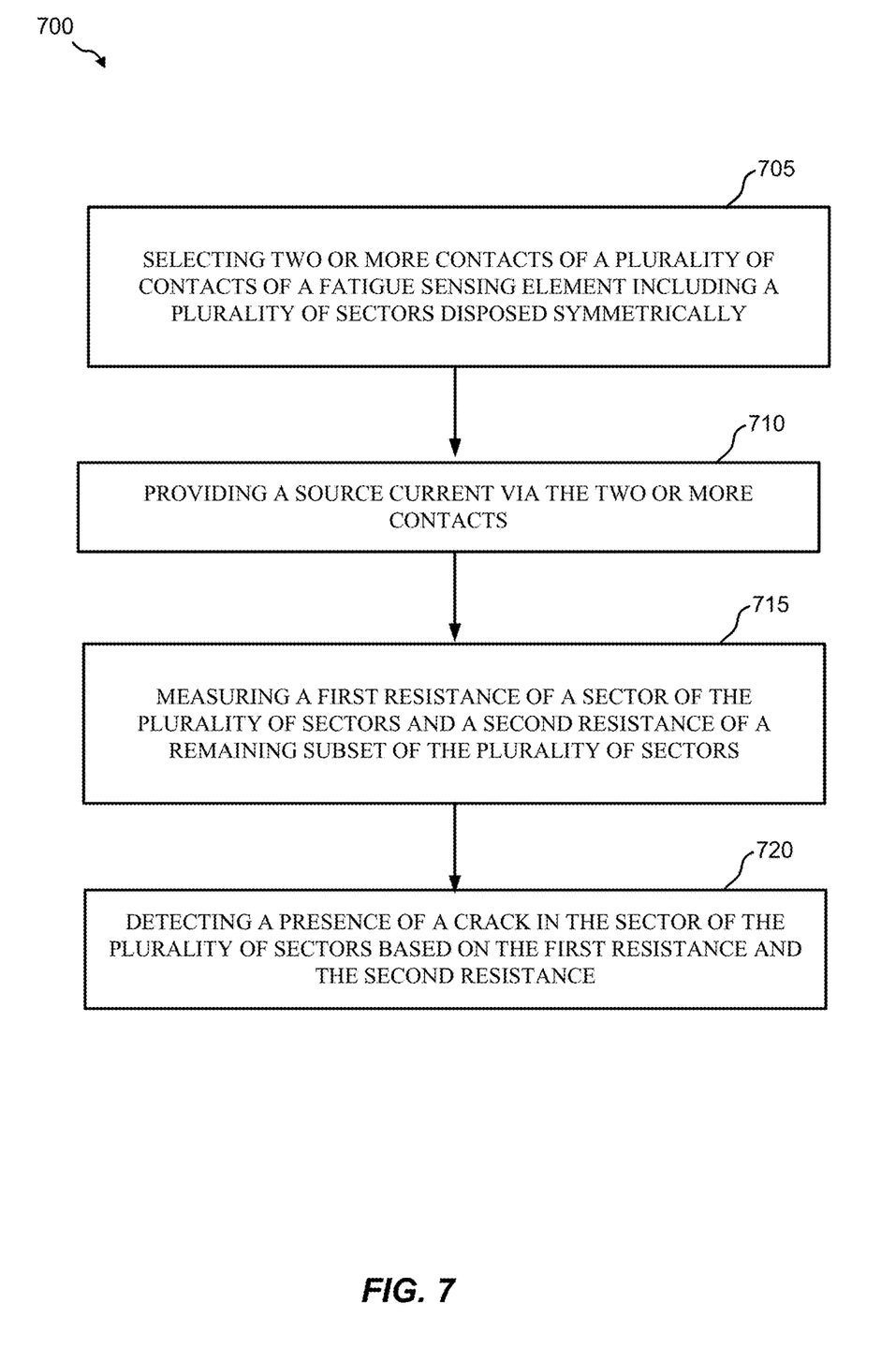
FIG. 7 illustrates an example of a method for crack detection according to aspects of the present disclosure.

Turning to FIG. 7, a method 700 for fatigue sensing may be implemented by the detection system 100 and/or one or more subcomponents of the detection system 100.

At 705, the method 700 may include selecting two or more contacts of a plurality of contacts of a fatigue sensing element including a plurality of sectors disposed symmetrically. For example, the switch 162 may select two or more contacts of the plurality of contacts 114.

At 710, the method 700 may include providing a source current via the two or more contacts. For example, the one or more current sources 164, 166 may provide the $I_{SOURCE}$.

At 715, the method 700 may include measuring a first resistance of a sector of the plurality of sectors and a second resistance of a remaining subset of the plurality of sectors. For example, the crack detection circuit 160 may be configure to measure a first resistance of a sector of the plurality of sectors and a second resistance of a remaining subset of the plurality of sectors.

At 720, the method 700 may include detecting a presence of a crack in the sector of the plurality of sectors based on the first resistance and the second resistance. For example, the crack detection circuit 160 may be configure to detect a presence of a crack in the sector of the plurality of sectors based on the first resistance and the second resistance.

Aspects of the present disclosure include the method above, further comprising measuring a plurality of resistances associated with a plurality of sectors.

Aspects of the present disclosure include any of the methods above, further comprising measuring a strain associated with the crack detection sensor.

Aspects of the present disclosure include any of the methods above, further comprising measuring a first strain prior to installing the crack detection sensor, measuring a second strain after installing the crack detection sensor and before a formation of the crack, and measuring a third strain after the formation of the crack.

Aspects of the present disclosure include any of the methods above, further comprising measuring a strain and a temperature associated with the crack detection sensor, wherein detecting the presence of the crack further comprises detecting the presence of the crack based on the strain and the temperature.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A fatigue sensing element, comprising:
    a plurality of sectors disposed around a center hole, the plurality of sectors being arranged to have a radial symmetry around the center hole; and
    a plurality of contacts configured to electrically coupled with one or more sectors of the plurality of sectors;
    wherein at least one sector of the plurality of sectors is configured to detect a crack and remaining sectors of the plurality of sectors are configured to compensate for one or more of environmental factors, strain, or aging during the detection of the crack.

2. The fatigue sensing element of claim 1, wherein the fatigue sensing element is a center propagating crack sensing element comprising a plurality of N sectors disposed concentrically and symmetrically around a hole, wherein each of the plurality of N sectors is 360/N° wide.

3. The fatigue sensing element of claim 1, wherein the plurality of contacts are disposed at boundaries of one or more sectors of plurality of sectors.

4. The fatigue sensing element of claim 1, wherein each of the plurality of sectors comprises a nanotube based polymer nano-composite (PNC) material.

5. The fatigue sensing element of claim 1, wherein the plurality of sectors includes an even number of sectors.

6. The fatigue sensing element of claim 1, wherein the plurality of sectors is a center propagating crack detection sensor having the center hole, six sectors, and six contacts.

7. The fatigue sensing element of claim 1, further comprising a crack detection system configured to measure first resistances of the one or more sectors of the plurality of sectors via two or more of the plurality of contacts to detect a crack in the at least one sector of the plurality of sectors.

8. The fatigue sensing element of claim 7, wherein the crack detection system is further configured to measure second resistances of the remaining sectors of the plurality of sectors to compensate for one or more of the environmental factors, the strain, or the aging.

9. The fatigue sensing element of claim 7, wherein the crack detection system further comprises one or more current source configured to provide a source current to the fatigue sensing element.

10. The fatigue sensing element of claim 7, wherein the crack detection system further comprises a switch configured to select the two or more of the plurality of contacts for measuring the resistances.

11. The fatigue sensing element of claim 7, wherein the crack detection system further comprises an analog-to-digital converter configured to measure a voltage difference between the two or more of the plurality of contacts.

12. A fatigue sensing system, comprising:
    a fatigue sensing element including a plurality of sectors disposed concentrically around a center hole within the crack detection sensor, the plurality of sectors being arranged to have a radial symmetry around the center hole;
    a plurality of contacts configured to electrically connect to one or more sectors of the plurality of sectors; and
    a fatigue sensing circuit including:
        a current source configured to provide a source current to the crack detection sensor;

a switch configured to select two or more of the plurality of contacts for providing the source current; and an analog-to-digital converter configured to:
measure a voltage difference between the two or more of the plurality of contacts; and
determine, based on the source current and the voltage difference, resistances of the one or more sectors of the plurality of sectors via the two or more of the plurality of contacts to detect a crack in the one or more sectors of the plurality of sectors.

13. The fatigue sensing system of claim 12, wherein the fatigue sensing element is a center propagating crack sensing element comprising a plurality of N sectors disposed concentrically and symmetrically around a hole, wherein each of the plurality of N sectors is 360/N° wide.

14. The fatigue sensing system of claim 12, wherein the plurality of contacts are disposed at boundaries of one or more sectors of plurality of sectors.

15. The fatigue sensing system of claim 12, wherein each of the plurality of sectors comprises a carbon nanotube (CNT) based polymer nano-composite (PNC).

16. The fatigue sensing system of claim 12, wherein the plurality of sectors is a center propagating crack detection sensor having the center hole, six sectors, and six contacts.

17. A method of detecting fatigue, comprising:
selecting two or more contacts of a plurality of contacts of a fatigue sensing element including a plurality of sectors disposed around a center hole, the plurality of sectors being arranged to have a radial symmetry around the center hole;
providing a source current via the two or more contacts;
measuring a first resistance of a sector of the plurality of sectors and a second resistance of a remaining subset of the plurality of sectors; and
detecting a presence of a crack in the sector of the plurality of sectors based on the first resistance and the second resistance.

18. The method of claim 17, further comprising estimating a size of the crack based on the first resistance and the second resistance.

19. The method of claim 17, further comprising:
measuring a first plurality of resistances associated with the plurality of sectors prior to installing the fatigue sensing element onto a surface to determine base resistances of each sector of the plurality of sectors;
measuring a second plurality of resistances associated with the plurality of sectors after installing the fatigue sensing element onto the surface and before a presence of a crack to compensate for strain introduced during the installing of the fatigue sensing element in each of the sector;
measuring a third plurality of resistances associated with the plurality of sectors; and
detecting the presence of the crack based on the first plurality of resistances, the second plurality of resistances, and the third plurality of resistances.

20. The method of claim 19, wherein detecting the presence of the crack comprises compensating for one or more of environmental factors, the strain, or aging.

* * * * *